3,274,196
PROCESS FOR THE PREPARATION OF 5-HALO-3,6-DISUBSTITUTED URACILS
Wallace W. Thompson, Wilmington, and Rollin H. Wallick, Claymont, Del., assignors to E. I. du Pont de Nemours and Company, Wilmington, Del., a corporation of Delaware
No Drawing. Filed Apr. 22, 1963, Ser. No. 274,802
1 Claim. (Cl. 260—260)

This application is a continuation-in-part of copending application Serial No. 183,760, filed March 30, 1962, now abandoned.

This invention relates to a process for the preparation of 5-halo-3,6-disubstituted uracils. It is more particularly directed to a process for preparing these uracils from 3,6-disubstituted uracils by halogenation, at elevated temperatures, according to the following equation:

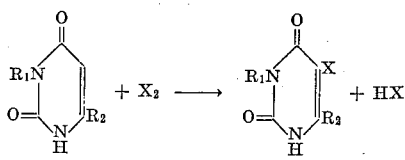

where $R_1$ is an alkyl, cycloalkyl or aryl radical having a molecular weight of 41–85;
$R_2$ is methyl or ethyl; and
X is chlorine or bromine.

The 3,6-disubstituted uracil starting materials in this equation can be prepared by the reaction of a properly substituted urea with a beta-keto ester to give a ureido intermediate; the ring is then closed under alkaline conditions to give the corresponding 3,6-disubstituted uracil product. The 3-substituted-6-methyluracil starting materials can also be prepared by reacting a properly substituted acetoacetamide with an alkyl carbamate to give an intermediate crotonamide, which is then ring-closed to give the corresponding uracil. Details regarding both these processes are set forth in copending applications Serial No. 148,819, filed October 13, 1961, and Serial No. 120,903, filed June 30, 1961.

In carrying out the process of this invention, enough of an appropriate uracil starting material is slurried in water or dilute (5%–25%) acetic acid to give a concentration of from 10% to 25%, by weight. A concentration of 15% to 20% by weight is preferred because high concentrations make the product slurry become thick and unwieldy, and lower concentrations make the process uneconomical because of solubility losses and capacity reduction. Use of acetic acid, in some cases, permits easier isolation of purer products. If acetic acid is not used and the pH of the uracil slurry is above 8, the pH is adjusted to 6–7 by adding a mineral acid such as sulfuric, hydrochloric or nitric.

Alternatively, a suspension can be formed by precipitating the uracil starting material from an alkaline solution obtained as an intermediate in the uracil's preparation according to the aforementioned processes. Precipitation is brought about by adding enough of a mineral acid such as sulfuric, hydrochloric or nitric to lower the pH to 6–7.

The suspension thus formed contains the 3,6-disubstituted uracil and minor amounts of impurities, as is usual with organic processes. If the process of the invention is run using such a suspension, the product is of slightly inferior quality.

In some cases in the alternate procedure, the uracil starting material does not form as a solid precipitate on the addition of acid but instead forms a separate oily phase. Direct use of this two phase mixture gives a slightly inferior product. Product quality can be improved by separating this oily uracil phase from the aqueous impurity-containing layer with such customary procedures as decantation or centrifugation. The thus purified uracil starting material is then suspended in water and is ready for halogenation.

In any case, the resulting uracil suspension is then heated to a temperature of between 60° C. to 100° C., preferably 80° C. to 100° C. Below 80° C., the reaction is rather slow; above 100° C., side reactions begin which can complicate recovery procedures. A molar equivalent of the chlorine or bromine is then introduced into the reaction mass as a gas or a liquid, and with agitation.

The length of time over which the halogen reactant is added is not critical. If it is added too rapidly, however, some of it will escape. Generally speaking, addition over a period of from ½ to 2 hours is satisfactory.

Optionally, the hydrogen halide by-product formed can be neutralized with aqueous 50% sodium hydroxide.

When the halogen addition is completed, the resulting slurry is cooled to ambient temperature. The solids in the slurry are then separated by conventional procedures such as filtration or centrifugation. The solids are washed with water to remove by-product salts and halogen acids, and are then dried according to customary procedures.

The uracils prepared according to this process are crystalline materials, easy to handle, filter and wash. This should be contrasted with the uracils produced according to processes used heretofore, in which halogenation is carried out at lower temperatures. Such processes give hard, lumpy, impure products which are difficult to handle and purify. In addition, halogenation at elevated temperatures permits more practical control of the reaction through use of the oxidation-reduction potential of the reaction mixture—something not feasible at lower temperatures.

The uracils produced according to this invention are useful as herbicides. Details regarding this utility will be found in copending application Serial No. 159,746, filed December 15, 1961.

This invention will be more easily practiced and more easily understood by referring to the following illustrative examples:

*Example 1*

The pH of 270 milliliters of an aqueous solution containing 34.5 grams of the sodium salt of 3-isopropyl-6-methyluracil, prepared according to the methods detailed in the aforementioned copending application Serial No. 120,903, filed June 30, 1961, is adjusted to 6.4 by the addition of 13.6 grams of 96% sulfuric acid. The solution is warmed to 85° C. Eleven milliliters of bromine are then added over a period of one hour, after which the slurry is cooled to 60° C., and the pH adjusted to 6.7 by the addition of 17.5 grams of 50% sodium hydroxide.

The resulting sulrry is cooled to 25° C. and the solids are filtered and then washed with two 45-milliliter portions of water. After these solids are dried in a vacuum oven at 60° C., there are obtained 41.4 grams of solid 97% pure 5-bromo-3-isopropyl-6-methyluracil.

*Example 2*

A slurry of 324 grams of 3-sec.-butyl-6-methyluracil in 2176 milliliters of water is heated to 85° C., and 278 grams of bromine are added over a one-hour period. After cooling to 50° C., the pH of the slurry is adjusted to 6.8 by the addition of 155 grams of 50% aqueous sodium hydroxide.

The resulting slurry is cooled to 25° C. and the solids are filtered, washed with two 500-milliliter portions of water, and dried. There are obtained 439 grams of essentially pure 5-bromo-3-sec.1butyl-6-methyluracil.

Example 3

A water slurry of 303 grams of 3-phenyl-6-methyluracil is prepared according to the method of copending application Serial No. 120,903, filed June 30, 1961. The pH of this slurry is reduced from 10.8 to 6.0 by the addition of 49 grams of 98% sulfuric acid. This neutralized slurry then is warmed to 85° C. and 250 grams of bromide are added over a period of one hour. The brominated slurry is cooled to 50° C. and the pH adjusted to 6.8 by the addition of 103 grams of 50% aqueous sodium hydroxide.

After cooling to 30° C., filtering, washing the solids with two 200-milliliter portions of water, and vacuum drying at 70° C., 303 grams of product are obtained containing about 80% 5-bromo-6-methyl-3-phenyluracil.

Example 4

A slurry of 84 grams of 3-isopropyl-6-methyluracil in 516 milliliters of water is heated to 100° C. and 51 grams of chlorine are bubbled in with agitation. After cooling the slurry to room temperature, its pH is adjusted to 6.7 by adding 50 grams of 50% aqueous sodium hydroxide. The slurry is then filtered, the solids washed with two 100-milliliter portions of water and dried to give 94 grams of product containing 85% 5-chloro-6-methyl-3-isopropyluracil.

Example 5

A slurry of 91 grams of 3-tert.-butyl-6-methyluracil in in 509 milliliters of water is adjusted to pH 7 with $H_2SO_4$ and heated to 85° C., and 80 grams of bromine are added dropwise over a period of one hour.

The slurry is then cooled to room temperature, filtered, and the solids washed with water and dried in a vacuum oven at 60° C. for 16 hours. A 90% yield of 5-bromo-3-tert.-butyl-6-methyluracil is obtained.

Example 6

A slurry of 91 grams of 3-sec.-butyl-6-methyluracil in 509 milliliters of water is heated to 95° C. and chlorine is bubbled in until 36 grams have been absorbed.

The slurry is cooled to room temperature, filtered and the solids washed with water and dried in a vacuum oven at 70° C. for 16 hours. The product is 3-sec.-butyl-5-chloro-6-methyluracil.

Example 7

The pH of an aqueous solution of 367.6 grams of the sodium salt of 3-isopropyl-6-methyluracil, prepared as described in copending application Serial No. 120,903, filed June 30, 1961, is reduced to 6.0 by the addition of 144 grams of 98% sulfuric acid. The resulting slurry is heated to 85° C. and bromide is added at the rate of 20 grams/3 minutes.

While adding the bromine, the relative oxidation-reduction potential is measured with a platinum-calomel electrode system. The addition of bromine is continued until there is a rapid change in this oxidation-reduction potential. A total of 285 grams bromine are required to complete the bromination.

The slurry is then cooled at 70° C., and the pH is adjusted to 6.5 by the addition of 148 grams of 50% aqueous sodium hydroxide. After cooling to 31° C., the slurry is filtered and the solids washed with two 500-milliliter portions of cold water to give 395 grams of solids analyzing 97% 5-bromo-3-isopropyl-6-methyluracil.

Example 8

The pH of 350 grams of a solution containing 76.1 grams of the sodium salt of 3-sec.-butyl-6-methyluracil prepared according to the method described in copending application Serial No. 123,636, filed July 13, 1961, is reduced to 6.0 by the addition of 22.1 grams of 98% sulfuric acid. After the addition of 70 milliliters of acetic acid, the resulting mixture is warmed to 85° C. Liquid bromine (65.8 grams) is added dropwise over a 40-minute period. The temperature is maintained at 85±2° throughout the addition.

The reaction mixture is then cooled to 25° C. and filtered. After washing the solids with 275 milliliters of cold water and drying, there are obtained 90.0 grams of a product analyzing 94% 5-bromo-3-sec.-butyl-6-methyluracil.

Example 9

Eighty-four grams of 3-isopropyl-6-methyluracil are slurried in a solution of 100 milliliters of acetic acid and 416 milliliters of water. This slurry is heated to 100° C. to give a homogenous solution.

Chlorine gas is then bubbled into the hot agitated solution at the rate of one gram per minute. In 40 minutes, the solution has absorbed 36 grams of chlorine, after which the mixture is cooled to 30° C. and 200 milliliters of water are added.

The pH of the resulting slurry is adjusted to 6.8 with 189 grams of 50% aqueous sodium hydroxide. After cooling to 30° C. again, the slurry is filtered and the solids washed with two 250-milliliter portions of cold water.

After drying, there are obtained 77 grams of essentially pure 5-chloro-3-isopropyl-6-methyluracil.

Example 10

A solution of 56 grams of the sodium salt of 3-sec.-butyl-6-methyluracil in 280 milliliters of water is prepared and acidified to pH 5.5 with 98% sulfuric acid. The temperature is maintained at 60–70° C. during the acidification. The solution is also agitated during the acidification; this agitation is maintained for about 30 minutes, at the same temperature and pH.

Agitation is then stopped, and the solution separates into two phases. The upper layer consists of 83 grams of brown oil.

The bottom water layer is separated and discarded, and 217 grams of water are added to the oil layer. This mixture is heated to 85° C., and 46.5 grams of liquid bromine are then added over a 38-minute period.

A granular precipitate is obtained. This slurry is then neutralized to pH 6.5 with 50% sodium hydroxide and is cooled to 25° C. After filtering, washing and drying, there are obtained 73.9 grams of 3-sec.-butyl-5-bromo-6-methyluracil, having a melting point of 152–155° C.

The embodiments of the invention in which an exclusive property of privilege is claimed are:

A process for the preparation of 5-halo-3,6-disubstituted uracils, said process comprising the steps of
  (a) heating a 3,6-disubstituted uracil in an aqueous medium to a temperature of from 60° C. to 110° C. in a liquid medium;
  (b) continuously adding a halogen selected from the group consisting of chlorine and bromine to said liquid medium, at said temperature;
  (c) measuring the oxidation-reduction potential of the reaction mass during said addition of halogen;
  (d) ceasing the addition of halogen when a rapid change occurs in the oxidation-reduction potential of the reduction mass;
  (e) cooling the resulting reaction mass; and
  (f) recovering the resulting solid 5-halo-3,6-disubstituted uracil from the reaction mass.

References Cited by the Examiner

FOREIGN PATENTS 1,270,771  7/1961  France.

OTHER REFERENCES

Brown: The Pyrimidines, pages 169–175, 217–219, published by Interscience Publishers, 1962.

Hilbert et al.: Journal American Chemical Society, vol. 56, pages 134–139, 1934.

ALEX MAZEL, *Primary Examiner.*

NICHOLAS S. RIZZO, HENRY R. JILES, *Examiners.*

JAMES W. ADAMS, JR., *Assistant Examiner.*